United States Patent
Barnes et al.

(10) Patent No.: US 7,697,614 B2
(45) Date of Patent: Apr. 13, 2010

(54) SYSTEM AND METHOD FOR CALIBRATING AN ANALOG SIGNAL PATH DURING OPERATION IN AN ULTRA WIDEBAND RECEIVER

(75) Inventors: Bobby L. Barnes, Cambridge, MA (US); Timothy R. Miller, Arlington, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 853 days.

(21) Appl. No.: 11/239,082

(22) Filed: Sep. 30, 2005

(65) Prior Publication Data

US 2007/0076818 A1    Apr. 5, 2007

(51) Int. Cl.
*H04L 27/08* (2006.01)

(52) U.S. Cl. ............... 375/245; 455/232.1; 455/241.1; 455/245.2

(58) Field of Classification Search ............... 375/224, 375/316, 340, 344, 345; 455/67.11, 192.2, 455/226.1, 232.1, 241.1, 245.2, 296
See application file for complete search history.

(56) References Cited

U.S. PATENT DOCUMENTS

| | | | | |
|---|---|---|---|---|
| 6,006,079 | A * | 12/1999 | Jaffee et al. | 455/310 |
| 6,977,976 | B1 * | 12/2005 | Birkett et al. | 375/345 |
| 7,027,791 | B2 * | 4/2006 | Twomey | 455/310 |
| 7,280,618 | B2 * | 10/2007 | Demir et al. | 375/322 |
| 7,280,812 | B2 * | 10/2007 | Demir et al. | 455/232.1 |
| 7,372,890 | B2 * | 5/2008 | Batra et al. | 375/130 |
| 2006/0066397 | A1 * | 3/2006 | Dupuie | 330/133 |
| 2006/0240779 | A1 * | 10/2006 | Rostami et al. | 455/63.1 |
| 2008/0020725 | A1 * | 1/2008 | Demir et al. | 455/232.1 |

* cited by examiner

*Primary Examiner*—Jean B Corrielus

(57) ABSTRACT

A system (500) and method (400) are presented for calibrating an analog signal path (200) associated with an Ultra Wideband (UWB) receiver (103). The analog signal path includes a plurality of analog gain stages (210, 212-214, 216), a local oscillator mixer stage (211), a compensation stage (218), and a converter stage (219). An information signal includes whitened symbols (306). When a predetermined number of whitened symbols are accumulated for one of a plurality of gain configurations, an arithmetic mean is calculated and used an offset value. The offset value is retrieved whenever the gain configuration is activated and applied at the compensation stage to reduce the offset.

12 Claims, 5 Drawing Sheets

SYSTEM AND METHOD FOR CALIBRATING AN ANALOG SIGNAL PATH DURING OPERATION IN AN ULTRA WIDEBAND RECEIVER

CROSS REFERENCE TO RELATED APPLICATIONS

The present application is related to application entitled "SYSTEM AND METHOD FOR CALIBRATING AN ANALOG SIGNAL PATH IN AN ULTRA WIDEBAND RECEIVER," filed on 31 Aug. 2005, as U.S. patent application Ser. No. 11/214,736, now U.S. Pat. No. 7,512,171.

FIELD OF THE INVENTION

The present invention relates generally to wireless communication systems, such as ultra wideband (UWB) systems. In particular, the present invention relates to a system and method in a receiver, including receivers located in mobile transceivers, centralized transceivers, related equipment, for calibrating in an analog signal path during reception of a UWB signal.

BACKGROUND OF THE INVENTION

Ultra Wideband (UWB) receivers face unique challenges in signal reception due to low signal levels, high signal frequencies, large bandwidths, and the like associated with the UWB signal environment. In particular, given that, for reasons understood in the art, UWB receivers are required to rapidly and accurately process low power, high speed incoming analog signal components, the analog signal path must be free from the influences of biases and offsets, particularly DC biases which may manifest themselves, for example, as an offset in a conversion stage. Such an offset causes a reduction in the useful conversion range and can lead to signal clipping and other undesirable anomalies capable of disrupting signal detection, recovery, accuracy, and so on.

Still further, to take advantage of digital signal processing, and to improve overall accuracy and detection capability across the input range, any bias or offset must be compensated for prior to conversion. However, because a large number of devices are manufactured at once and due to process variances, not all circuits will have the same bias. It will be appreciated that in application specific integrated circuits (ASICs), analog sections of the circuit are extremely sensitive and can be affected differently by small variations in fabrication tolerances. To address these variances, calibration is usually necessary involving manual termination of the RF signal input stage by manually attaching a signal ground or other terminator to the input of a signal path. Such manual calibration is time consuming, expensive, and subject to human and systematic error and is therefore undesirable.

Still further, manual calibration methods ignore problems associated with bias drift caused by temperature variations occurring during operation and the like. When an operating environment experiences temperature variations the initial calibration may no longer be valid and can lead to poor reception, loss of information, and the like.

Thus it would be advantageous for a receiver to be capable of providing calibration during signal reception without the need for manual termination of the RF signal input stage. Still further, such calibration could be performed whenever necessary, such as periodically, when device operating temperatures rise, on demand, or the like.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENTS

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as an embedded processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

While the present invention can be described in connection with a wireless UWB receiver, it can be practiced on any electronic circuit or device of any kind including wired devices such as wired UWB receivers.

UWB Calibration Signal Environment

Figure 1:
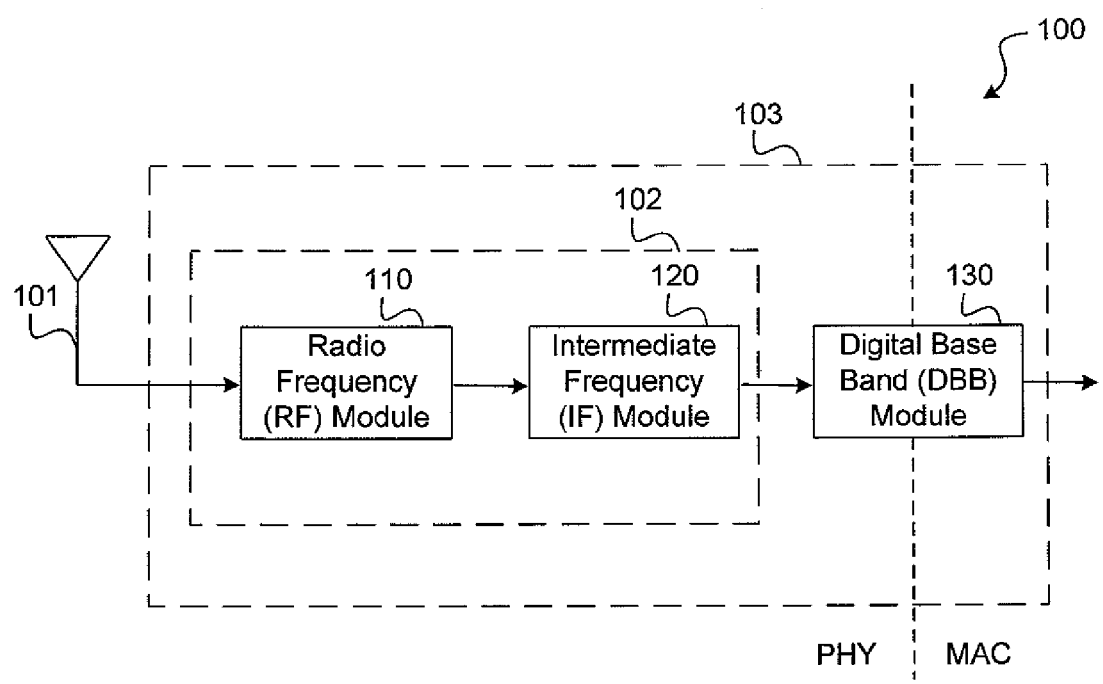
FIG. 1 is a diagram illustrating portions of an exemplary Ultra Wideband (UWB) receiver in accordance with various exemplary embodiments of the present invention.

A typical UWB receiver configuration 100, for example, as shown in FIG. 1, includes an antenna 101, an analog or radio frequency (RF) front end section 102, including an RF module 110 and an optional intermediate frequency (IF) module 120. The IF module 120 is noted and shown as being optional since a typical UWB receiver is a direct conversion receiver and converts from the transmission frequency directly to the base band frequency or to near the baseband frequency. It will be appreciated that while RF module 110 and the IF module 120 are shown as being within the RF front end section 102, the modules can be independently integrated, integrated together as shown, or combined into a larger integrated circuit such as receiver module 103 or the like which can also include a digital base-band (DBB) module 130. It will also be appreciated in the art that DBB module 130 is shown between the media access control (MAC) layer and the physical layer (PHY) as will be understood by one of ordinary skill. The configuration of the boundary between the MAC and the PHY layer is for illustrative purposes and depends largely on the functions carried out by the DBB module 130. In other configurations and embodiments the PHY/MAC boundary can be shifted to the left, for example, when most or all of the functions of DBB module 130 are associated with MAC functionality.

Figure 2:
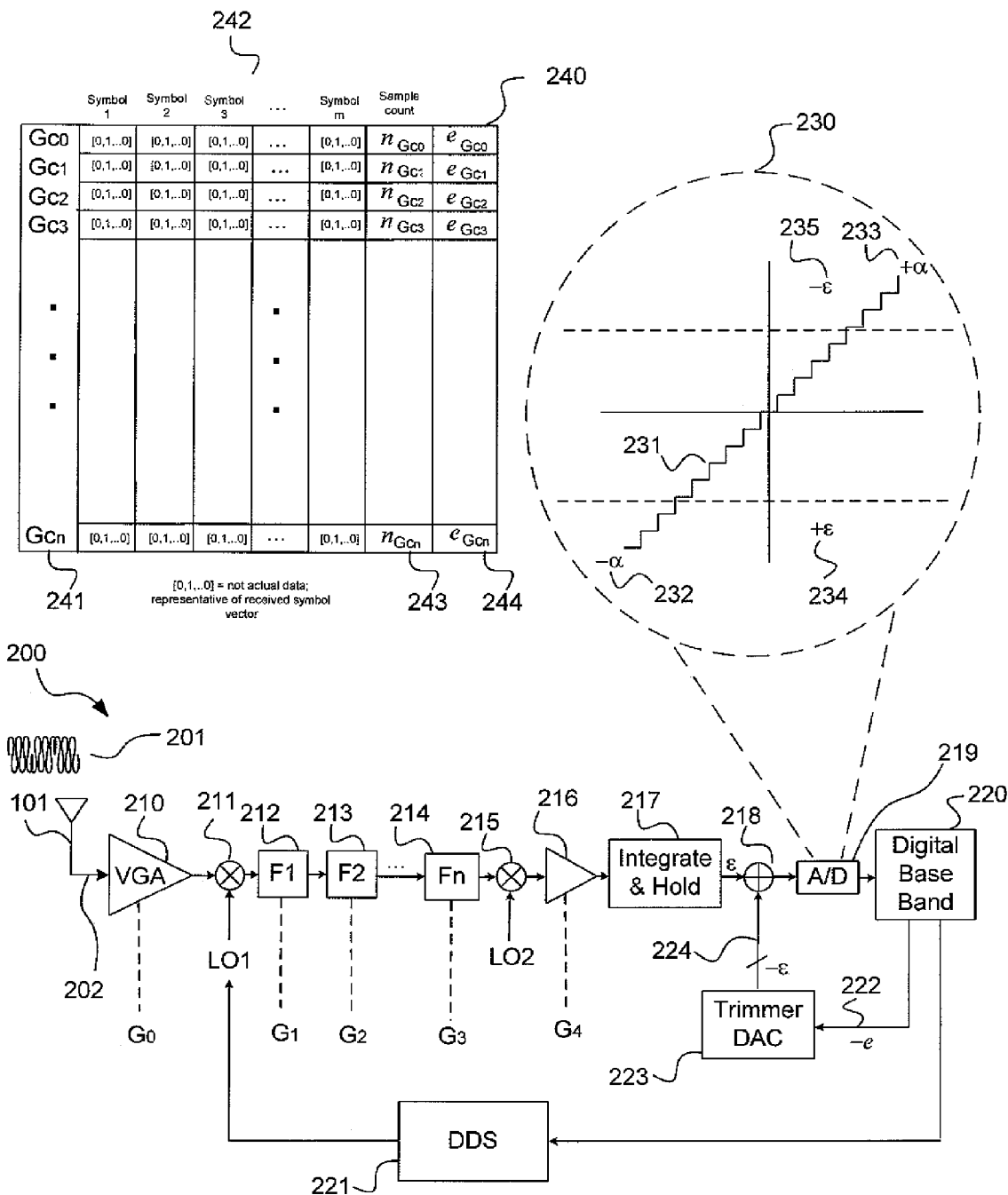
FIG. 2 is a block diagram illustrating various blocks of an exemplary receiver including a converter and an exemplary offset storage table in accordance with various exemplary embodiments of the present invention.

In accordance with various exemplary embodiments, a UWB receiver can be provided with a signal path 200, having various filters, amplifiers, and the like as shown in block diagram form in FIG. 2. The input 202 to the signal path 200 would, during normal operations, be signal energy received on antenna 101. During calibration however, such as during manufacturing test or the like, the input 202 to signal path 200 would typically be connected to a signal ground (not shown) so as to zero all incoming signal energy. In accordance with the present embodiment however, calibration can be performed during the reception of a signal by taking advantage of the effects provided by signal whitening, which is applied to a transmitted signal during encoding. Signal whitening balances the occurrence of logical ones and logical zeros. For bipolar signaling, the expected value of the mean of a whitened signal would be zero. Accordingly, for a particular gain configuration, any non-zero value of an arithmetic mean or average taken over a number of samples read at the output of the A/D converter 219 can be attributable to offset such as to DC components in the analog portion of the signal path 200 attributable to process variations, hybrid parameters, leakage, and the like.

In a typical calibration operation in, for example, a manufacturing environment, the input 202 to signal path 200 is manually connected to a signal ground (not shown) during a calibration interval or period, and each of the possible gain configurations associated with gain control signals can be independently set and an offset reading taken, for example, at the output of the A/D converter 219. The offset can be stored in association with the gain configuration and, during normal operation, an offset associated with the present gain configuration can be retrieved and applied in the signal path as a compensation value through the use of a digital to analog converter (DAC) referred to as a trimmer DAC or a set of trimmer DACs within the receive path as will be described in greater detail hereinafter. Any offset can be retrieved and applied in such a manner whenever the corresponding gain configuration is set during normal operation.

In accordance with the present invention, it is further desirable to allow calibration to be conducted during operation outside the manufacturing environment or at least without manual intervention, such as without the manual application of a signal ground to the input 202 of signal path 200 and while actually receiving a UWB signal. The input 202 remains connected to antenna 101 and a received signal 201 can be processed. Calibration can thus be performed during operation and signal reception whenever circumstances require calibration such as when operating temperatures reach a certain level. The calibration scenario performed based on data whitening can be considered a more realistic calibration environment since the application of a signal ground may itself introduce random or systematic errors through ground loops or other anomalies.

The signal path 200 further includes processing elements such as a variable gain amplifier 210, a first local oscillator (LO1) mixer 211, a filter F1 212, such as a bandpass filter or the like, a filter F2 213, such as a bandpass filter or the like, and possibly more digital filter elements or the like, such as a filter Fn 214, each of which can be associated with processing a received signal. The signal path 200 may further contain a second local oscillator (LO2) mixer 215, an amplifier 216, an integrate & hold unit 217, and a summer 218. While the components described hereinabove are generally associated with an analog signal path portion, the signal path 200 can also have what can be referred to as a digital signal path portion, including for example an analog-to-digital A/D converter 219, a digital base band (DBB) controller 220 capable of generating an error or offset value e 222. The offset value e 222 can be input to a trimmer digital to analog converter DAC 223 which can generate an analog compensation value $-\epsilon$ 224 to be added in the signal path 200 which will be opposite in value of an analog bias or offset value $\epsilon$ output from the integrate & hold unit 217. The analog compensation value $-\epsilon$ 224 thus provides compensation or calibration for any offset $\epsilon$ which may be present in the signal output, for example, from the A/D converter 219. An inset 230 shows a diagram of a quantization graph 231 showing quantization steps associated with the output of the A/D converter 219 for a ramp signal input. Ideally, the range of the output for the A/D converter 219 should be from $-\alpha$ 232 to $+\alpha$ 233. However, an offset or bias level, such as a DC bias level introduced from the analog signal path can create a lower offset 234 and/or an upper offset 235 changing the practical operating range of the A/D converter 219. The offset can cause anomalies such as signal clipping or distortion making it more difficult to accurately process an incoming signal.

In accordance with various exemplary embodiments, each of the gain related processing elements such as the VGA 210, the F1 212, the F2 213, the filter Fn 214, and the amplifier 216 may be controlled with one of the gain control signals G0-G4 and one or more of the elements may be activated in association with each of the gain configuration GC0-GCn 241 for processing the received signal 201 at various gain levels. Since some of the processing elements may have variations, for example arising during wafer fabrication, offsets are measured independently for each of the gain configurations GC0-GCn 241. The gain configurations GC0-GCn 241 are formed from possible combinations of gain settings of the processing elements activated by different combinations of the gain control signals G0-G4. As each of the different gain configurations GC0-GCn 241 are set during reception of the signal 201, corresponding symbol values are taken at the output of the A/D converter 219 and recorded in the symbol portion 242 of the table 240 for the corresponding gain configuration. As symbols are accumulated in the symbol portion 242, a count value such as a sample count 243 is incremented. Each individual value in the column of the sample count 243 represents the number of symbols accumulated for the corresponding one of the gain configurations GC0-GCn 241. A threshold value of the sample count 243 can be set to reflect a window size for collecting samples. As will be appreciated by one of ordinary skill in the art, the window size will correspond to a sufficient number of samples to take advantage of the whitening effect. More specifically the window size, that is, the number of symbol samples, should be set sufficiently large such that the arithmetic mean of the symbol samples trends toward zero and any bias will be revealed as a non-zero value of the arithmetic mean. It should be noted that it is not necessary to actually store all of the sampled data. For example, an accumulator (not shown) for each gain stage can be initialized to zero and incremented by the value of each symbol received at that gain setting. Once the number of desired samples have been accumulated for any particular gain setting, the accumulated value for that gain setting can be further processed to determine any necessary change to the bias correction DACs, such as trimmer DAC 223 or a series of trimmer DACs.

When a predetermined number of symbols are accumulated in connection with a gain configuration, an average or arithmetic mean of the symbols can be calculated. As will be described in greater detail hereinafter, symbols to be transmitted are whitened and interleaved during encoding and, statistically, the mean of a series of symbols will tend toward zero due to the effects of the whitening and interleaving. Thus, an average of the symbols calculated over a period of time should tend toward zero and any non-zero value of the average can be assumed to represent offset, DC bias, or the like and can be used for compensation purposes.

An arithmetic mean or average of the symbol values 242 is calculated for each gain configuration when the sample count 243 for that gain configuration reaches the prescribed count value. When calculated, the corresponding one of offset values $e_{GC0}$-$e_{GCn}$ 244 for each gain configuration is stored, for example in the table 240 in a memory. Once the offset is calculated and stored, it can be used any time the corresponding one of the gain configurations GC0-GCn 241 is set during operation. Meanwhile, if a gain configuration that has not accumulated enough symbol samples is set again in the course of processing the incoming signal, the symbols received during the time when the gain configuration is set are stored and the count is incremented until enough samples have been accumulated, and so on, for each gain configuration. As each average is calculated and stored as an offset, it can then be used in providing compensation whenever the corresponding gain configuration is set during signal processing.

Thus in accordance with the present invention, in order to approximate the coupling of the input 202 of the signal path 200 to ground 201, as previously described, calibration can be conducted during operation, such as during reception of a UWB signal by taking advantage of the properties of the whitening and interleaving performed during encoding of the UWB signal by a transmitter. It is important to note that, in contrast to other calibration approaches, during calibration in accordance with the present invention, an input signal is expected to be processed and can be processed on the signal path 200 while calibration is being performed.

Figure 3:
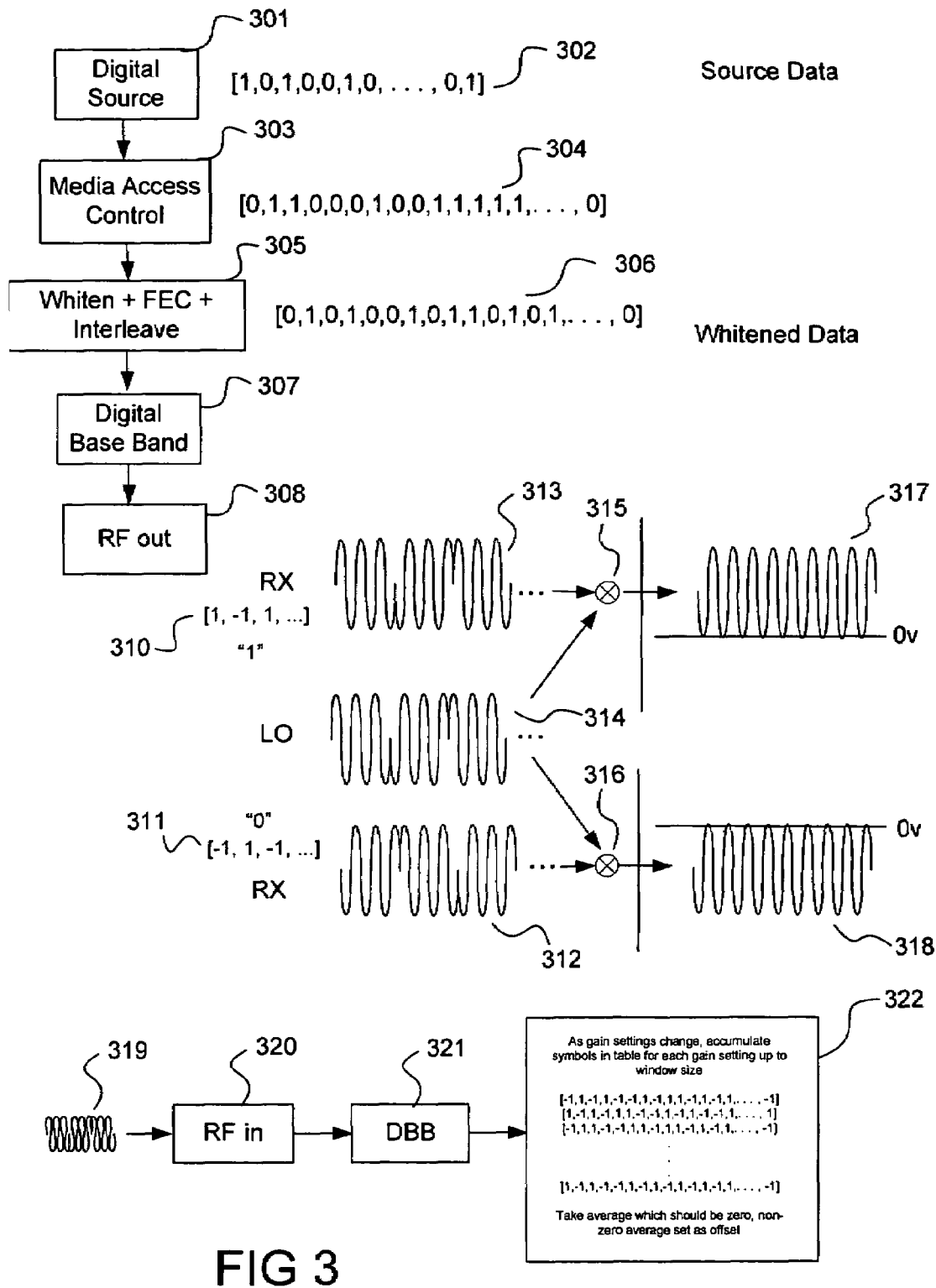
FIG. 3 is a diagram illustrating various exemplary processing and encoding layers associated with a received waveform including a whitening and interleaving procedure in accordance with various exemplary embodiments of the present invention.

FIG. 3 illustrates exemplary scenario 300 showing encoding of source data prior to transmission and processing on the signal path 200 during signal reception. During encoding for transmission, a typical UWB data source can be a digital source 301 such as a digital video camera or the like. The digital source can generate digital data 302 consisting of a series of 1 and 0 bits typically formed in blocks and generated in a real time stream. The raw data such as the digital data 302 can be input to a media access control (MAC) processing block 303 which can add overhead to the digital data 302 in the form of, for example, headers, frame check sums, and the like. The data is passed to a PHY layer convergence block where whitening, forward error correction (FEC) encoding, and interleaving are performed. The FEC can take the form of encoding the digital data 302 with a cyclic code such as a Vitterbi code or the like which is generated by an encoder (not shown) when the digital data 302 is input thereto. The MAC processing block 303 generates the FEC encoded source data 304, which can then be sent to an interleaving block 305. It will be appreciated that whitening serves to balance the occurrence of logical "1"s and "0"s in the bit stream to generate whitened data 306. Whitening can be performed by a whitening transform, as will be appreciated by one of ordinary skill in the art, and can involve transforming an arbitrary vector, such as the FEC encoded source data 304, into a whitened vector, such as the whitened data 306 having a zero mean and an identity covariance matrix. The significance of generating whitened vectors is that over time, all such arbitrarily whitened vectors will should have a zero mean due to bipolar modulation.

When the whitened data 306 has been generated, it can be passed to a digital base band module 307 to be prepared for transmission, for example, by modulating, up converting and the like in a radio frequency (RF) module 308 as will be appreciated by one of ordinary skill. The RF module 308 can then be used to transmit signal to a receiver such as an exemplary receiver in accordance with the present invention. On the receiver side, various coded representations of "1"s and "0"s are received. For example, as shown, a one can be represented a coded representation 310 for a 1 and a coded representation 311 for a −1 or a "0" bit. Depending on the presently received bit, for example in the case of a "1", which can be modulated as a [1, −1, 1] as will be appreciated by one of ordinary skill, a corresponding tricyclic phase modulated signal 313 can be input to a mixer 315 such as, for example the LO1 mixer 211, and a LO signal 314 can be applied thereto. It will be appreciated that the LO signal 314 during the calibration interval will be a normal LO signal and will be modulated according the expected information in the received signal. The resulting composite signal 317 will be a positive sinusoid. For a "0", which can be modulated as a [−1, 1, −1], a corresponding tricyclic phase modulated signal 312 can be input to a mixer 316 such as, for example the LO1 mixer 211, and the LO signal 314 can be applied thereto. The resulting composite signal 318 will be a negative sinusoid.

With reference still to FIG. 3, it can thus be seen that for a received signal 319, which can be processed in a RF in processing block 320, a series of symbols can be generated for example within digital baseband block 321 for a particular gain configuration. A block 322 represents a series of symbols collected in connection with a particular gain configuration. When a sufficient number of symbols are collected, the arithmetic mean of the symbols is calculated and any non-zero value of the arithmetic mean will be established as the offset.

Figure 4:
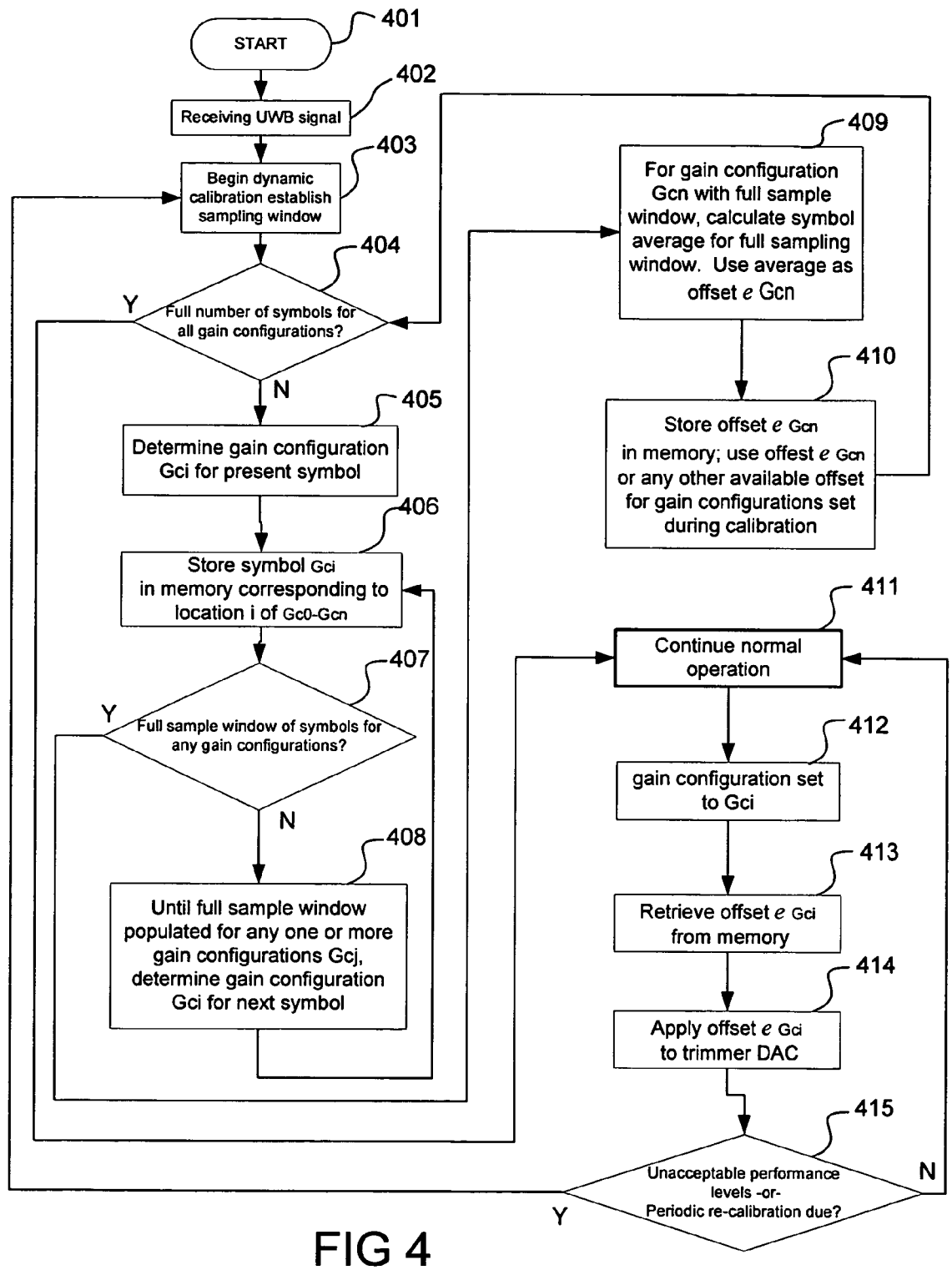
FIG. 4 is a flow chart illustrating procedures associated with a method in accordance with exemplary embodiments of the present invention.
Figure 5:
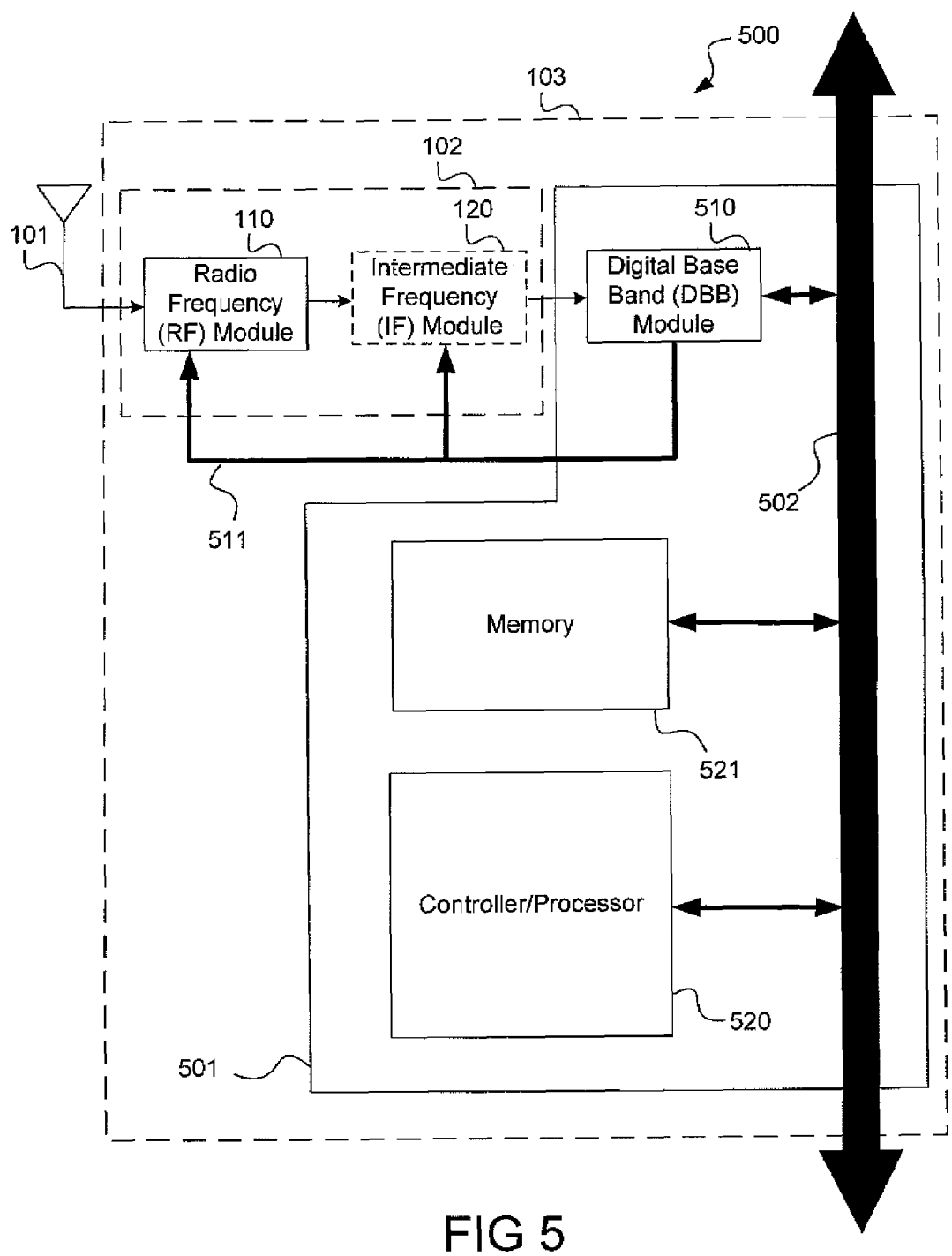
FIG. 5 is a diagram of a receiver apparatus in accordance with various exemplary embodiments of the present invention.

To better understand exemplary calibration procedures in accordance with the invention, an exemplary method or procedure 400 is shown in FIG. 4 and described herein. After start at 401, for example after power-up or the like, dynamic calibration in accordance with the present invention can be conducted during reception of a UWB signal at 402. When dynamic calibration begins, a sampling window size can be established at 403, which is the number of symbols samples to be collected prior to calculating the arithmetic mean. A test can be conducted at 404 to determine whether a full number of samples has been accumulated for each gain configuration, for example, by reading table 240, checking a flag or the like. If the full number of symbols has not been collected for each gain configuration, then the present gain configuration GCi can be determined at 405. The present symbol is stored in memory at 406, for example in the symbol portion 242 of table 240 corresponding to the gain configuration GCi. A test can be performed at 407 to determine whether a full sample window has been accumulated for any of the gain configurations. If not, then the gain configuration for the next symbol can be determined at 408 and the exemplary procedure can continue to loop through 406-408 while receiving symbols and changing gain configurations until a full sample window is accumulated. When a full sample window is accumulated for a gain configuration GCn, that is when the number $n_{GCn}$ has been reached, the arithmetic mean or average of the symbols in the window can be calculated at 409 and the mean can be used as the offset $e_{GCn}$ for the gain configuration. The offset $e_{GCn}$ can then be stored at 410 in a memory such as in the offset portion 244 of table 240. The procedure can then return to 404 to determine whether the full number of symbols has been accumulated for all gain configurations. If not, then the procedure can continue to loop through 405-410 while reception of data continues. If the full number of symbols has been accumulated for all gain configurations, then normal operation can continue at 411. Normal operation can be defined as operation where no further calibration is being conducted during signal reception although it will be appreciated that symbol samples can continue to be accumulated for periodic updates to offset data or to monitor offset levels or the like. The decision to continuously perform calibration activity can be based on requirements for additional processing resources, power consumption, or the like. Once the full number of symbols has been accumulated for all gain configurations, when a gain configuration GCi is set at 412, the corresponding offset $e_{GCi}$ can be retrieved from memory, such as from table 240 at 413. The offset $e_{Gci}$ can be applied, for example at the trimmer DAC 223 to provide compensation. At 415, the exemplary procedure can test whether, for example, unacceptable performance levels are being experienced, whether re-calibration is due, or the like, and can loop to 403 where dynamic calibration can be reinitiated such as by establishing a sampling window size or the like. Alternatively, the exemplary procedure can loop to 403 whenever calibration is desired such as in response to drastic temperature variations, or in accordance with a predetermined schedule or the like or in some instances can be conducted continuously. If re-calibration is not called for, the exemplary procedure can loop to, for example, 411 to continue normal operation as described above.

The exemplary method or procedure 400 or alternative procedures can be implemented in an apparatus or system 500, which in accordance with some embodiments, can represent in a more detailed fashion the receiver module 103 including the signal path 200 as shown. In addition to the elements described herein above in connection with FIGS. 1 and 2, the exemplary receiver or receiver system can include a circuit 501 having a processor 520 memory 521 and a digital base band module 510 coupled by a bus 502. The DBB module 510 is similar to the DBB module 130 with the addition of control bus 511 which, as will be appreciated, can include, for example, the gain control signals G0-G4 242 and other signals used to control and configure the RF module 110 and the IF module 120. It will also be appreciated that the memory 521 may contain instructions or other information for processing in accordance with the claimed invention as described herein above.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A method for calibrating in an analog signal path associated with an Ultra Wideband (UWB) receiver, the analog signal path including a plurality of selectable analog gain stages and a compensation stage, the method comprising:
   receiving a plurality of symbols associated with an information signal in the analog signal path to form a plurality of received symbols, the plurality of received symbols whitened according to a whitening procedure, the information signal processed in the UWB receiver according to a plurality of gain configurations, the plurality of gain configurations including a plurality of combinations of ones of the plurality of analog gain stages;
   storing values of the plurality of received symbols obtained at a converter stage in a storage device in association with corresponding ones of the plurality of gain configurations that are active when respective ones of the plurality of received symbol are processed by the UWB receiver; and
   calculating an arithmetic mean when a predetermined number of the stored values associated with one of the plurality of gain configurations has been accumulated to form an offset value associated with the one of the plurality of gain configurations.

2. A method as recited in 1, further comprising:
   storing the offset value associated with the one of the plurality of gain configurations in the storage device; and
   retrieving and applying the offset value at the compensation stage whenever the one of the plurality of gain configurations is activated to reduce the offset value.

3. A method as recited in 1, further comprising:
   repeating the calculating for all of the plurality of gain configurations when the predetermined number of the stored values associated with all of the plurality of gain configurations has been accumulated to form a corresponding plurality of offset values; and
   applying one of the plurality of offset values at the compensation stage whenever a corresponding one of the plurality of gain configurations is activated to reduce the offset value.

4. A method as recited in 1, further comprising calculating additional arithmetic means when the predetermined number of the stored values associated with additional ones of the plurality of gain configurations has been accumulated to form additional offset values associated with the additional ones of the plurality of gain configurations.

5. A method as recited in 4, further comprising repeating the calculating the additional arithmetic means until the additional offset values are formed for all of the plurality of gain configurations.

6. A method as recited in claim 1, wherein the offset includes a direct current (DC) offset associated with one or more components in the analog signal path.

7. A circuit for calibrating in an analog signal path associated with an Ultra Wideband (UWB) receiver, the analog signal path including a plurality of selectable analog gain stages and a compensation stage, the circuit comprising:
- means for receiving a plurality of symbols associated with an information signal in the analog signal path to form a plurality of received symbols, the plurality of received symbols whitened according to a whitening procedure, and for processing the information signal according to a plurality of gain configurations, the plurality of gain configurations including a plurality of combinations of ones of the plurality of analog gain stages;
- means for storing values of the plurality of received symbols obtained at a converter stage in a storage device in association with corresponding ones of the plurality of gain configurations that are active when respective ones of the plurality of received symbol are processed by the means for receiving; and
- means for calculating an arithmetic mean when a predetermined number of the stored values associated with one of the plurality of gain configurations has been accumulated to form an offset value associated with the one of the plurality of gain configurations.

8. A circuit as recited in 7, further comprising:
- means for storing the offset value associated with the one of the plurality of gain configurations in the storage device and for
- retrieving and applying the offset value at the compensation stage whenever the one of the plurality of gain configurations is activated to reduce the offset value.

9. A circuit as recited in 7, further comprising:
- means for repeating the calculating for all of the plurality of gain configurations when the predetermined number of the stored values associated with all of the plurality of gain configurations has been accumulated to form a corresponding plurality of offset values and for
- applying one of the plurality of offset values at the compensation stage whenever a corresponding one of the plurality of gain configurations is activated to reduce the offset value.

10. A circuit as recited in 7, wherein the means for calculating is further configured to calculate additional arithmetic means when the predetermined number of the stored values associated with additional ones of the plurality of gain configurations has been accumulated to form additional offset values associated with the additional ones of the plurality of gain configurations.

11. A circuit as recited in 10, wherein the means for calculating is configured to repeat calculating the additional arithmetic means until the additional offset values are formed for all of the plurality of gain configurations.

12. A circuit as recited in claim 7, wherein the offset includes a direct current (DC) offset associated with one or more components in the analog signal path.

* * * * *